United States Patent [19]

Gebo

[11] Patent Number: 4,469,289

[45] Date of Patent: Sep. 4, 1984

[54] REEL STAND

[76] Inventor: George B. Gebo, 4645 E. Industrial St., #2, Simi Valley, Calif. 93063

[21] Appl. No.: 427,548

[22] Filed: Sep. 29, 1982

[51] Int. Cl.³ .................... B65H 49/00; B65H 49/32; F16B 7/04

[52] U.S. Cl. ................................ 242/85; 242/129.51; 242/139; 248/410; 414/911; 403/104

[58] Field of Search .................. 242/85, 86, 86.5, 106, 242/129, 129.5, 129.51, 129.6, 136, 139; 248/410, 354 L, 352; 414/911; 403/374, 104

[56] References Cited

U.S. PATENT DOCUMENTS

| 764,344 | 7/1904 | Buckelew | 242/86.5 R |
|---|---|---|---|
| 970,884 | 9/1910 | Carter | 242/129.6 |
| 1,718,657 | 6/1929 | Manny | 248/352 |
| 2,051,969 | 8/1936 | Shastock | 248/410 X |
| 2,090,550 | 8/1937 | Pilblad | 403/104 |
| 3,120,358 | 2/1964 | Ensley | 242/129.6 |
| 3,968,940 | 7/1976 | Godberson | 242/86.5 R |

*Primary Examiner*—Stuart S. Levy
*Assistant Examiner*—Lloyd D. Doigan
*Attorney, Agent, or Firm*—Roger A. Marrs

[57] ABSTRACT

A free standing apparatus is disclosed herein for rollably supporting a reel of spool of cable including a pair of stanchions separated by the reel. Each stanchion is provided with a base supporting an upright post with braces and further includes a slidable, self-locking carriage for rotatably holding an axle on which the reel is carried. A releasable holding device is operably disposed on the carriage to permit selective sliding and locking of the carriage on the post.

1 Claim, 6 Drawing Figures

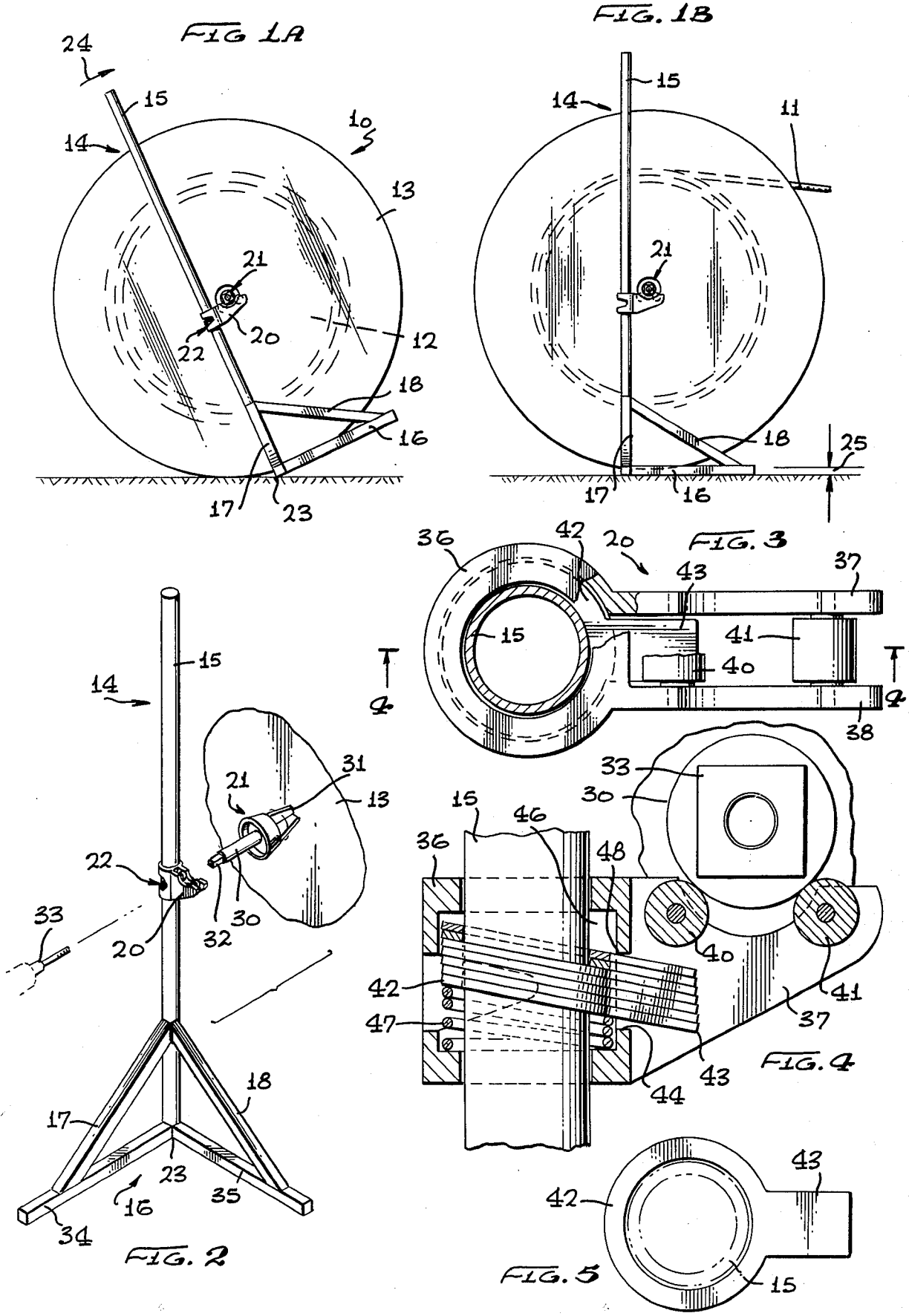

REEL STAND

BACKGROUND OF THE INVENTION

1. Field of the Invention

The present invention relates to cable or wire reel storage devices and more particularly to a novel such reel or spool having a stanchion supporting apparatus adapted to be manually moved into a rollable position supporting the reel or spool on the ground.

2. Brief Description of the Prior Art

In the past, it has been the conventional practice to mount wire or cable spools onto a fixed stand so that the cable or wire stored on the spool can be withdrawn or unwound in an orderly manner. Generally, such stands are hydraulically operated in as much as a fully loaded reel or spool is extremely heavy and difficult to manually lift or move. In other instances, mechanical stands employing a jack mechanism is used to lift the spool or reel on an axle so that the cable or wire can be withdrawn therefrom.

Such prior attempts to rollably mount a spool or reel carrying a stored wire or cable generally includes any elaborate mechanism for positioning axle engaging holders under the axle of the reel or spool so that the entire assembly can be lifted for spool or reel rotation. Thus, such prior art devices are expensive, awkward to handle and are extrememly complex in their construction and operation.

Therefore, a long-standing need has existed to provide a reel or spool holding and lifting means by a fully loaded spool or reel can be manually oriented with respect to a lifting stand and wherein the lifting stand can be manually manipulated to lift and raise the spool above the supporting surface whereby the spool may be rotated to dispense required lengths of cable or wire stored thereon.

SUMMARY OF THE INVENTION

Accordingly, the above problems and difficulties are obviated by the present invention which provides a novel reel or spool supporting stand comprising a pair of stanchions opperably disposed on opposite sides of a spool and which includes axle means detachably engagable with the opposite ends of the spool and each of the stanchions comprising a post carrying an axle holder adapted to engage with the axle holder means of the spool. Each of the posts is upwardly mounted from a brace supported base and the axle holder or carriage is slidably mounted on the post so as to be readily positional underneath the end of an axle. Releasable locking means are incorporated into each of the carriages whereby the carriage may be fixedly attached or secured along the length of the post.

Therefore, it is among the primary objects of the present invention to provide a novel reel or spool supporting apparatus adapted to be manually disposed under a wire or table spool so that the apparatus may be manually moved to lift the spool into a rollably supportable position.

Another object of the present invention is to provide a novel reel stand having a pair of stanchions on opposite sides of the spool and readily engagable with the opposite sides for lifting and rotatably supporting the spool thereon.

Still another object of the present invention is to provide a novel reel or spool lifting and supporting apparatus which is economical to manufacture, easy to use and which does not require extensive tools, skill or complex mechanisms.

Yet another object of the present invention is to provide a novel stand for lifting cable or wire reels and spools that may be operated by a single individual without mechanical assistance in order to lift the spool into a rotatable position for dispensing stored wire or cable thereon.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following descriptions, taken in connection with the accompanying drawings in which:

FIGS. 1A and B are side elevational views of the novel reel stand incorporating the present invention;

FIG. 2 is a front perspective view of a stanchion included in the reel stand of FIG. 1;

FIG. 3 is an enlarged cross-sectional view of the stanchion shown in FIG. 2 and illustrating the axel carriage carried thereon;

FIG. 4 is a longitudinal cross-sectional view of the axel carriage shown in FIG. 3 as taken in the direction of arrows 4—4 thereof; and FIG. 5 is a plan view of a typical locking lug or washer used in the locking device disposed on the carraige.

DESCRIPTION OF THE PREFERRED EMBODIMENT

Referring to FIG. 1, a conventional storage reel or spool is indicated in the general direction of arrow 10 incorporating a plurality of turns of cable or wire indicated in general by the wire 11. The cable or wire is wound about a cross member 12 and opposite ends of the cross member terminate in ends or sides such as circular end 13.

The novel reel or stand is composed of a pair of stanchions and a stanchion on one side of the spool pin is indicated in the general direction of arrow 14. It is to be understood that an identical stanchion of the pair is disposed on the other side of the spool so that the reel or spool seperates both of the support stanchions.

Each stanchion includes an elongated post 15 supported in an upright position from a base 16 which includes braces 17 and 18. An axle carriage 20 is slidably mounted on the post 15 and is adapted to move along the length of the post 15 to a desired location. Once the location has been determined by the user, such as immediately under an axle 21, a locking means 22 automatically self-locks the carriage 20 in the desired location.

As shown in FIG. 1A, the reel stand of the present invention has been placed under the axle 21 so that the carriage on opposite sides of the axle carried on the respective posts 15 are adjusted to be immediately under the axle. This is done in a stand position where the base 16 includes a corner 23 serving as a pivot-point so that when the posts 15 are grasped by the hands of the user and pushed in the direction of arrow 24 the stand will pivot on point 23. Such motion will lift the reel upwardly from the supporting surface on the ground and forwardly until the base 16 completely rests on the supporting surface as shown in FIG. 1B. The weight of the spool urges the carriage to move on the respective posts 15; however, such movement is resisted on a self-locking mechanism 22 that retains the carriage in a releasable position on the posts. At this time, the cable 11 may be withdrawn from storage on the spool as the spool is now raised from the ground as indicated between the arrows identified by numeral 25.

Relating now in detail to FIG. 2, it can be seen that the actual means 21 includes a shaft 30 which terminates at one end in a plurality of blades or flanges 31 forming a tapered wedge adapted to be inserted into a hole normally provided in the ends 13 of the spool. Since the ends are composed of wood, the respective flanges or blades 31 imbed themselves into the wood for securement. The shaft 30 outwardly projects from the end 13 and is available for engaging with the carriage 20. The extreme end of the shaft 30 opposite from its end carrying the wedge 31 terminates in a square, flat arrangement 32 adapted to be engaged by the chuck of a motor drive in a event that powered rotation of the reel or spool is desired.

FIG. 2 also discloses that the base 16 includes a support channel or member 34 and a similiar support member or channel 35 which are joined at the pivot-point 23 normal to each other. The juncture of the members 34 and 35 is also at the end of post 15 opposite to its end adapted to be engaged by the hand of the user in moving the stand and reel from the position shown in FIG. 1A to the position shown in FIG. 1B.

Referring now to FIGS. 3 and 4, the novel carraige 20 is illustrated as comprising a circular body 36 having a pair of support elements 37 and 38 outwardly projecting from the body in a form of a yoke. Disposed between the opposite surfaces of the support members 37 and 38 there is provided a pair of rollers 40 and 41 on which the axle shaft 30 rides in rollable relationship. FIG. 4 clearly shows this arrangment.

FIG. 4 also illustrates a novel self-locking arrangment comprising a plurality of washers, such as washer 42 arranged in a stack about the post 15. Each washer in the stack includes a tab 43 which outwardly extends through an opening 44 in the body 36 of the carriage. Thus, the washers 42 are located within a cavity 46 in the body 36 of the carriage and are free to slide along the post 15, but are captured within the cavity 46 because of the tabs outwardly projecting through the openings 44. Self-locking is provided by means of helical spring 47 carried about the post 15 within the cavity 46 and expanding against the bottom of the body 36 and against the underside of the stack of washers 32. Therefore, the spring 47 is constantly urging a portion of the washer against the corner 48 leading into the entrance of the opening 44.

At the same time, it is to be noticed that the stack of washers are angled so that the respective edges of the washers bears opening of the washers against the post 15 in a binding relationship. For release, tension is taken off of the carriage such as by moving the reel back to the position shown in FIG. 1A and the underside of the tabs 43 may be manually moved to release any bite or binding of the washers with the post 15. At this time, the carriage 20 may be moved to another position or location on the post 15.

In FIG. 5, a plain view of a typical washer used in the self-locking means is illustrated and it is to be understood that each of the washers in the stack include a circular portion with an outstanding or projecting tab 43.

In view of the foregoing, it can be seen that the novel stand of the present invention provides an inexpensive and relatively easy to use stand whereby a loaded reel may be raised from the ground and placed in a rolling position for dispensing cable or wire 11. Not only does the reel or spool rotate on the axle, but the axle shaft 21 will roll on the rollers 40 and 41 to accomodate ease of wire or cable dispensing.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A pivoting storage reel or spool stand comprising:
   a cable or wire storage reel having opposite ends;
   axle means carried on said reel ends lying along the turning axis thereof;
   stanchion means including a pair of spaced apart posts separated by said reel rollably engagable with said axle means;
   base means carried on said stanchion means for supporting said stanchion means and said reel on a supporting surface;
   said base means having a pivot location about which said stanchion means rotates carrying said reel therewith in an arcuate path about said base means pivot location;
   carriage means slidably mounted on each of said posts having rollers for movably supporting said axle means;
   releasable self-locking means operably carried on each of said carriages for securing with said posts;
   said self-locking means includes a spring biased stack of lugged washers adapted to selectively bind with said post and carriage in position on said post;
   said axle means includes a pair of shafts, each shaft having a wedge on one end engagable with the end of said reel and a square fitting on its opposite end; said shaft being adapted to rollably rest on said rollers of said carriage;
   each of said carriages includes a cylindrical body having a cavity storaging said self-locking lugged washers and an outwardly projecting yoke carrying said rollers with said post extending upwardly through said cavity;
   said lugged washers adapted to bind between said post and said carriage to releasably secure said carriage to said post;
   said base means includes a pair of support members joined at opposing adjacent ends at a right angle with respect to each other to define a juncture and said juncture further joined by one end of said post normal to said support members;
   said juncture of said support members and said post end constituting said pivot location; and
   each of said posts having a hard grip end opposite its ends joined with said support members for use by the user in manually pivoting said reel about said pivot location.

* * * * *